J. Q. C. SEARLE.

BASE-BURNING STOVE.

No. 7,212. Reissued July 4, 1876.

Witnesses J. L. Ehrhorn
Harry Smith.

John Q. C. Searle
by his Atty's
Hoyson and Son

N. PETERS, PHOTO-LITHOGRAPHER, WASHINGTON, D. C.

UNITED STATES PATENT OFFICE.

JOHN Q. C. SEARLE, OF CINCINNATI, OHIO.

IMPROVEMENT IN BASE-BURNING STOVES.

Specification forming part of Letters Patent No. 136,772, dated March 11, 1873; reissue No. 7,212, dated July 4, 1876; application filed June 14, 1876.

*To all whom it may concern:*

Be it known that I, JOHN Q. C. SEARLE, of Cincinnati, Ohio, have invented certain Improvements in Base-Burning Stoves, of which the following is a specification:

The objects of my invention are, first, to prevent the ignition of the fuel in the magazine of a base-burning stove; second, to insure the thorough combustion of the fuel in the combustion-chamber; and, third, to provide for the thorough circulation of the products of combustion through the stove before they are permitted to pass off to the outlet. These objects I attain in the manner which I will now proceed to describe, reference being had to the accompanying drawing, in which—

Figure 1:
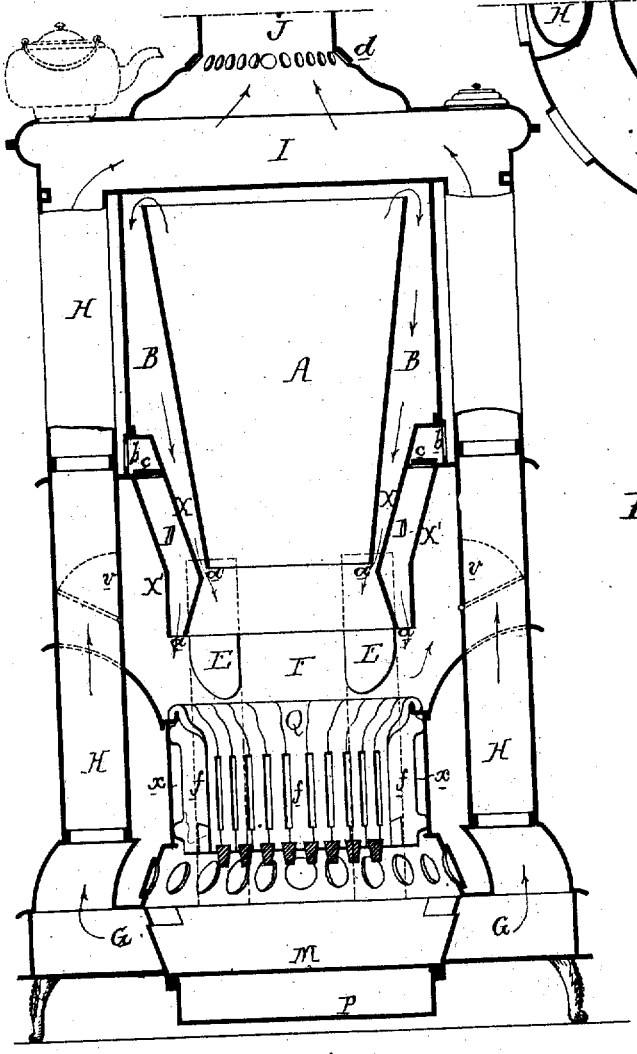
Figure 3:
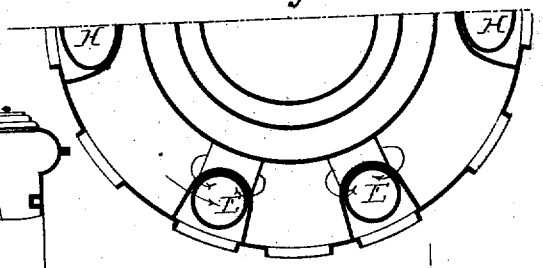
Figure 2:
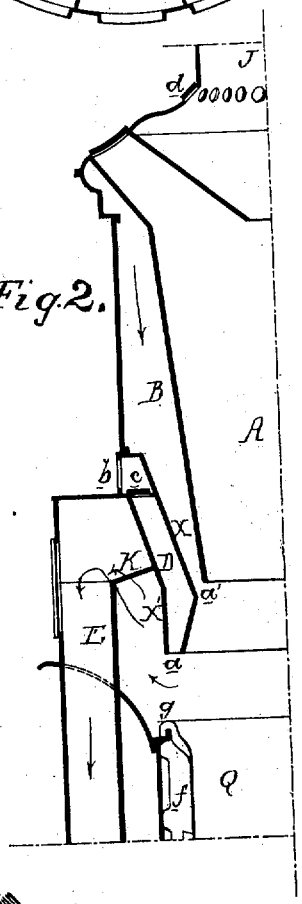
Figure 4:
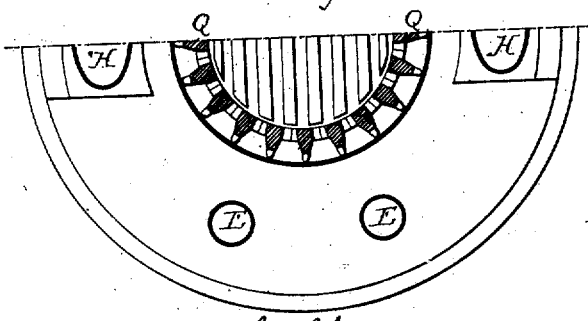
Figure 5:
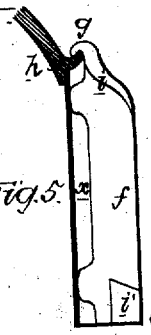
Figure 6:
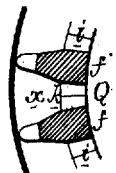

Figure 1 is a longitudinal vertical section of my improved stove; Fig. 2, a transverse vertical section of a portion of the same; Figs. 3 and 4, sectional plan views; and Figs. 5 and 6, detached views of parts of the stove drawn to an enlarged scale.

A is the fuel-magazine, which communicates at the top with a chamber, B, the upper portion of which is contained between the wall of the magazine and the outer casing of the stove, while its lower portion is bounded by the wall of the magazine and a casing, X, which projects below the said magazine A so as to form the lower end of the same. Between the casing X and an exterior casing, X′, there is an air-chamber, D, supplied with air at the top through openings *b* in the casing of the stove, the admission of air to the said chamber D being regulated, however, by a register, *c*. It will thus be seen that the two casings X X′ inclosing the air-chamber D form an obstruction in the upper part of the combustion-chamber to prevent the access of the products of combustion to the upper portion of the magazine. It is preferable to use this double casing with its intermediate air-chamber, as it is more durable than if the obstruction were formed of but a single casing.

The air-chamber D communicates with the combustion-chamber F of the stove through an annular opening, *a*, at the lower end, and the chamber B has an annular outlet, *a′*, intervening between the wall of the magazine and the casing X of the chamber D, and serving to establish communication between the said chamber B and the combustion-chamber.

Such gases as are generated in the magazine, instead of being allowed to remain therein and induce the ignition of the fuel, enter the chamber B and descend through the same, and pass from its outlet *a′* directly into the mass of ignited fuel in the lower end of the magazine, thus serving, together with the air which enters through the air-chamber D, to facilitate the thorough and effective combustion of the fuel in the combustion-chamber.

The circulation of the heated products of combustion through the stove is obtained by means of descending flues E, forming a communication between the combustion-chamber F and a chamber, G, at the base of the stove, and by ascending flues H, which connect the chamber G with the chamber I at the top of the stove, the products of combustion passing off through a central outlet-flue, J, furnished with a register, *d*, for checking the draft when necessary. The diving-flues E extend upward into the combustion-chamber to a point considerably above the lower end of the casing X, as shown in Fig. 1 and in the vertical section, Fig. 2, and in order to prevent the products of combustion from passing too directly into the said flues, deflectors K, Figs. 2 and 3, are interposed batween the flues and the casing X, said deflectors directing the products of combustion outward toward the exterior walls of the stove and around the sides of the said flues, as indicated by the arrows. When a direct draft is required valves *v v* in the sides of the flues H within the combustion-chamber are opened.

The prevention of the dropping of ashes or ignited fuel from between the bars of the grate upon the floor when the ash-drawer is removed, is attained by means of a sliding plate, M, Fig. 1, adapted to guides at the bottom of the ash-pit, and thus serving to catch and retain all falling particles.

The grated fire-pot Q is composed of a number of independent and separately-detachable vertical bars *f*, Figs. 1, 4, 5, and 6, each formed with a hooked upper end, *g*, by means of which it is suspended from a circular flange, *h*, on the body of the stove, and each having upon both sides two lugs, *i* and *i'*, which maintain the said bars at a proper distance apart from each other, and thus form spaces *k* between the same for the admission of air from the annular space *x* surrounding the fire-pot to the mass of ignited fuel contained within the latter. The bars being entirely separate and independent of each other, any or all of them can be readily removed and replaced by new ones when such renewal becomes necessary in consequence of the burning out or injuring of the said bars.

I claim as my invention—

1. A stove in which a casing or obstruction extends below and forms the lower end of the magazine, and in conjunction therewith forms a passage, *a'*, substantially as described, through which the gases may pass through the fuel above the said lower end.

2. A stove in which an obstruction, for preventing the passage of the products of combustion to the upper part of the magazine, extends below and forms the lower end of the said magazine, substantially as described.

3. A stove in which a casing or obstruction, preventing the passage of the products of combustion to the upper part of the magazine, extends below and forms the lower end of the magazine, substantially as described, in combination with a register above the lower end of said obstruction, and serving to regulate the admission of air to the fuel, as set forth.

4. The combination, in a stove, of a flue or flues, H, connecting chambers at the top and base of the stove, and one or more flues, E, communicating with the lower chamber and with the combustion-chamber, with an obstruction surrounding the lower end of the magazine and preventing the upward passage of the products of combustion, as set forth.

5. The deflectors K interposed between the descending-draft flues E, and the casing or obstruction which prevents the upward passage of the products of combustion from the combustion-chamber.

In testimony whereof I have signed my name to this specification in the presence of two subscribing witnesses.

JOHN Q. C. SEARLE.

Witnesses:

HUBERT HOWSON,

HARRY SMITH.